United States Patent
Zhu

(10) Patent No.: US 9,019,893 B2
(45) Date of Patent: Apr. 28, 2015

(54) METHOD FOR CONFIGURING NEIGHBOR LIST AND FEMTOCELL CORE PROCESSOR USING THE SAME

(75) Inventor: Ling Zhu, Su Zhou (CN)

(73) Assignee: Sernet (Suzhou) Technologies Corporation, Jiangsu (CN)

( * ) Notice: Subject to any disclaimer, the term of this patent is extended or adjusted under 35 U.S.C. 154(b) by 266 days.

(21) Appl. No.: 13/605,864

(22) Filed: Sep. 6, 2012

(65) Prior Publication Data

US 2013/0064182 A1 Mar. 14, 2013

(30) Foreign Application Priority Data

Sep. 13, 2011 (CN) .......................... 2011 1 0269223

(51) Int. Cl.
*H04W 4/00* (2009.01)
*H04W 36/00* (2009.01)
*H04W 84/04* (2009.01)

(52) U.S. Cl.
CPC ........ *H04W 36/0083* (2013.01); *H04W 84/045* (2013.01)

(58) Field of Classification Search
USPC .................. 370/331–332, 338; 455/435.1
See application file for complete search history.

(56) References Cited

U.S. PATENT DOCUMENTS

| | | | |
|---|---|---|---|
| 6,411,819 B1 * | 6/2002 | Gutowski | 455/525 |
| 7,110,766 B1 * | 9/2006 | Tayloe et al. | 455/438 |
| 8,107,964 B2 * | 1/2012 | Nylander et al. | 455/444 |
| 8,489,108 B2 * | 7/2013 | Chan et al. | 455/453 |
| 8,559,953 B2 * | 10/2013 | Maida et al. | 455/436 |
| 2005/0282546 A1 * | 12/2005 | Chang et al. | 455/436 |
| 2007/0097938 A1 * | 5/2007 | Nylander et al. | 370/338 |
| 2007/0254620 A1 * | 11/2007 | Lindqvist et al. | 455/403 |
| 2008/0227455 A1 * | 9/2008 | Kim | 455/436 |
| 2009/0003279 A1 | 1/2009 | Abusch-Magder et al. | |
| 2009/0042577 A1 | 2/2009 | Tolli et al. | |
| 2009/0059867 A1 | 3/2009 | Rajasimman et al. | |
| 2009/0131049 A1 * | 5/2009 | Osborn | 455/435.1 |
| 2010/0124930 A1 * | 5/2010 | Andrews et al. | 455/436 |
| 2010/0190496 A1 * | 7/2010 | Chinnathambi | 455/435.1 |
| 2010/0203891 A1 * | 8/2010 | Nagaraja et al. | 455/436 |
| 2011/0039520 A1 * | 2/2011 | Maida et al. | 455/411 |

FOREIGN PATENT DOCUMENTS

WO 2011018640 A1 2/2011

OTHER PUBLICATIONS

EP Search Report dated Dec. 6, 2012.

* cited by examiner

*Primary Examiner* — Nicholas Jensen
*Assistant Examiner* — Berhanu Belete
(74) *Attorney, Agent, or Firm* — McClure, Qualey & Rodack, LLP

(57) ABSTRACT

A method for configuring a neighbor list is provided. The method is applied to a femtocell to establish a neighbor list. The method includes steps of: accessing a Public Land Mobile Network (PLMN) list in the femtocell, the PLMN list recording a circuit-switched (CS)/packet-switched (PS) service weighting; determining a weighting parameter with reference to history CS/PS amount information and the CS/PS service weighting of the femtocell; selecting n macrocells from the PLMN list according to the weighting parameter, n being a natural number; and filling the n macrocells into the neighbor list.

12 Claims, 10 Drawing Sheets

METHOD FOR CONFIGURING NEIGHBOR LIST AND FEMTOCELL CORE PROCESSOR USING THE SAME

This application claims the benefit of People's Republic of China application Serial No. 201110269223.4, filed Sep. 13, 2011, the subject matter of which is incorporated herein by reference.

BACKGROUND

1. Technical Field

The disclosure relates in general to a femtocell core processor and a method for configuring a neighbor list, and more particularly to a femtocell core processor and a method for configuring a neighbor list that configure a neighbor list with reference to history information of circuit-switched (CS) and packet-switched (PS) amounts.

2. Description of the Related Art

A femtocell has been developed by current techniques for bring convenience to the daily life, and is generally applied in a household or a small-sized office environment. The femtocell, by connecting to a system provider via broadband, serves as a miniature communication base station of the system provider in the household or small-size office environment, so as to connect to a user equipment (e.g., a mobile phone) in the household or small-sized office environment. In other words, through the femtocell, a network of the system provider can be extended into the household or small-sized office environment.

For example, the femtocell communicates with the user equipment in the household or small-sized office environment through protocols including Global System for Mobile Communications (GSM), Code Division Multiple Access (DDMA) 2000, Time Division-Synchronous Code Division Multiple Access (TD-SCMDA), Worldwide Interoperability for Microwave Access (WiMAX) and Long-Term Evolution (LTE).

Further, by configuring a neighbor list in the femtocell, the femtocell achieves seamless exchange of a user equipment between femtocells or between the femtocell and another base station. However, specific regulations are not clearly defined for configuring a neighbor list in current femtocell standards. Therefore, there is a need for a solution for providing a method capable of more efficiently configuring a neighbor list.

SUMMARY OF THE DISCLOSURE

The disclosure is directed to a femtocell core processor and a method for configuring a neighbor list for a femtocell. The femtocell core processor and the method for configuring a neighbor list of the present disclosure configure a neighbor list with reference to a Public Land Mobile Network (PLMN) list T_PLMN in the femtocell. The femtocell core processor and the method for configuring a neighbor list of the present disclosure further obtain a priority value for each of the macrocells in the PLMN list T_PLMN with reference to a ratio of history circuit-switched (CS) and packet-switched (PS) services and a CS/PS service weighting in the PLMN list T_PLMN, and allocate information of neighboring areas according to the macrocells having higher priority values. Therefore, compared to a conventional method for configuring a neighbor list of a femtocell, the femtocell core processor and the method for configuring a neighbor list of the present disclosure offer an advantage of configuring a neighbor list according to history CS/PS amounts and by flexibly referring to PLMN list information.

According to an example of the present disclosure, a method for configuring a neighbor list in a femtocell to establish a neighbor list is provided. The method includes steps of: accessing a PLMN list in the femtocell, the PLMN list recording a CS and PS service weighting; determining a weighting parameter with reference to history CS/PS amount information and the CS/PS service weighting; selecting n macrocells from the PLMN list according to the weighting parameter, n being a natural number; and filling the n macrocells into the neighbor list.

According to another example of the present disclosure, a femtocell core processor applied to a femtocell is provided. The femtocell comprises a neighbor list storage unit for storing a neighbor list. The femtocell core processor configures the neighbor list, and includes a first access unit, a weighting generating unit, a selecting unit and a configuring unit. The first access unit accesses a PLMN list of the femtocell, wherein the PLMN list records a CS/PS service weighting. The weighting generating unit determines a weighting parameter with reference to history CS/PS amount information and the CS/PS service weighting of the femtocell. The selecting unit selects n macrocells from the PLMN list according to the weighting parameter, where n is a natural number. The configuring unit fills the n macrocells into the neighbor list.

The above and other contents of the disclosure will become better understood with regard to the following detailed description of the preferred but non-limiting embodiments. The following description is made with reference to the accompanying drawings.

DETAILED DESCRIPTION OF THE DISCLOSURE

First Embodiment

Figure 1:
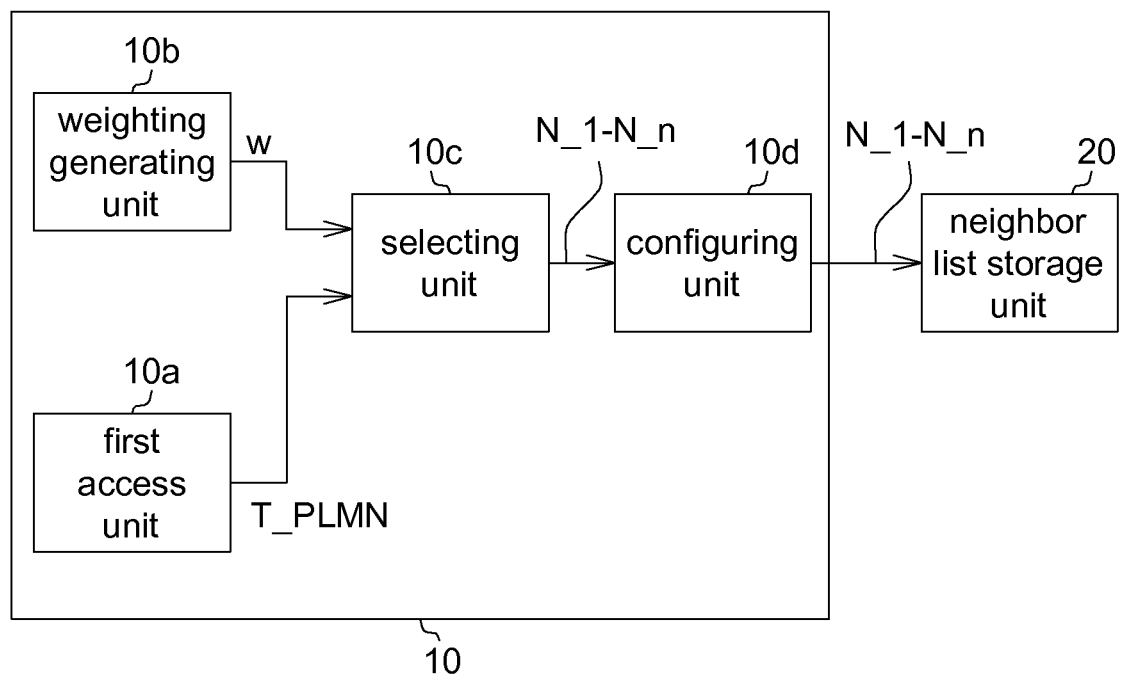
FIG. 1 is a block diagram of a femtocell according to a first embodiment of the present disclosure.

FIG. 1 shows a block diagram of a femtocell according to a first embodiment of the present disclosure. Referring to FIG. 1, a femtocell 1 of this embodiment includes a femtocell core processor 10 and a neighbor list storage unit 20. The neighbor list storage unit 20 stores a neighbor list Table_NA, which is configured by femtocell core processor 10.

For example, the femtocell core processor 10 includes a first access unit 10a, a weighting generating unit 10b, a selecting unit 10c and a configuring unit 10d. The first access unit 10a access a Public Land Mobile Network (PLMN) list T_PLMN in the femtocell 1. The PLMN list T_PLMN records a circuit-switched (CS)/packet-switched (PS) service weighting. For example, a macrocell Macro_1 is one of the macrocells recorded in the PLMN list T_PLMN, and has a corresponding CS/PS service weighting of 2:5.

The weighting generating unit 10b determines a weighting parameter W with reference to history CS/PS amount information and the CS/PS service weighting. The history CS/PS amount information is a ratio of CS services and PS services executed in past operations of the femtocell 1. For example, in the past operations of the femtocell 1, the ratio of the CS services and PS services is 7:3 and the CS/PS service weighting is 1:1, the weighting generating unit 10b then generates a weighting parameter W of 7/3.

According to the weighting parameter W, the selecting unit 10c obtains a priority sequence of the macrocells in the PLMN list T_PLMN. Taking the macrocell Macro_1 for example, the corresponding service weighting is 2:5. The selecting unit 10c obtains a priority value P_Macro_1 with reference to the CS/PS service weighting and the ratio of past CS and PS services (e.g., 7/3) of the macrocell Macro_1. For example, the priority value P_Macro_1 satisfies:

$$P\_Macro\_1 = 7 \times 2 + 7 \times 5 = 49.$$

Similar to the operation performed on the macrocell Macro_1, the selecting unit 10c calculates a priority value for all the macrocells in the PLMN list T_PLMN, and identifies n higher priority values N_1, N_2, . . . , and N_n, where n is a natural number greater than 1.

The configuring unit 10d fills the n higher priority values N_1 to N_n into the neighbor list Table_NA to accordingly configure the neighbor list Table_NA, where n is a natural number greater than 1.

In conclusion, the femtocell core processor 10 of this embodiment first obtains the priority or each of the macrocells in the PLMN list T_PLMN according to the ratio of past CS and PS services and the CS/PS service weighting of each of the macrocells in the PLMN list T_PLMN, and allocates the information of the neighboring areas according to the macrocells having higher priority values. Thus, when seamless exchange of a user equipment is desired, the femtocell 1 of this embodiment can more efficiently exchange communication between the femtocell 1 and the user equipment to a neighbor capable of supporting communication services associated with the user equipment, thereby offering the user equipment with preferred communication services.

Second Embodiment

Figure 2:
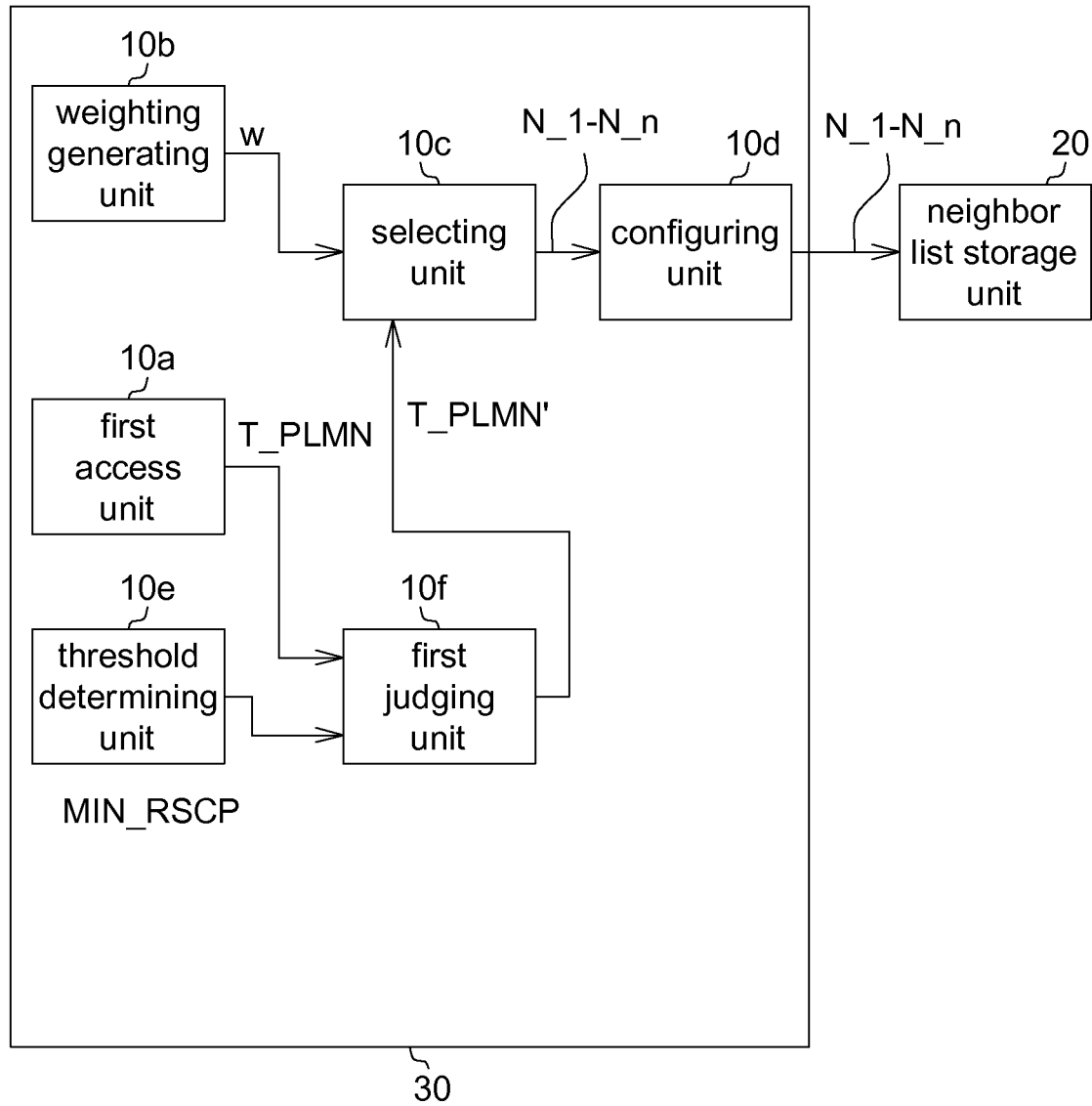
FIG. 2 is a block diagram of a femtocell according to a second embodiment of the present disclosure.

FIG. 2 shows a block diagram of a femtocell according to a second embodiment of the present disclosure. A main difference between a femtocell core processor 30 in this embodiment and the femtocell core processor 10 in the first embodiment is that, the femtocell core processor 30 further includes a threshold determining unit 30e and a first judging unit 30f. The threshold determining unit 30e determines a Received Signal Code Power (RSCP) lower threshold MIN_RSCP. In one example, the threshold determining unit 30e correspondingly determines the RSCP lower threshold MIN_RSCP according to settings of a system provider.

In another embodiment, the threshold determining unit 30e correspondingly determines the RSCP lower threshold MIN_RSCP according to the following equations (1) and (2):

$$\text{Pathloss\_RC} = P\_PCPICH\_RC - RSCP\_PCPICH\_RC \quad (1)$$

$$\text{Max\_Pathloss} = UE\_VIP\_Pathloss + \text{Power Offset} \quad (2)$$

Where Pathloss_RC is a path loss of a remote base station, P_PCPICH_RC is an actual transmit power value of Primary Common Pilot Channel (PCPICH) of the remote base station and may be obtained from decoding a broadcast message of the remote base station by the femtocell 3, RSCP_PCPICH_RC is a power value received by the femtocell 3, UE_VIP_Pathloss is a service provider designated value that determines an access range of the femtocell 3, and Power Offset is a power offset in a constant value.

By determining whether the RSCP value of each of the macrocells in the PLMN list T_PLMN is substantially greater than the RSCP lower threshold MIN_RSCP, the first judging unit 30f filters the macrocells in the PLMN list T_PLMN, and provides a filtered PLMN list T_PLMN' to the selecting unit 30. The RSCP value of each of the macrocells in the filtered PLMN list T_PLMN is substantially greater than the RSCP lower threshold MIN_RSCP.

The selecting 30c of this embodiment receives the filtered PLMN list T_PLMN', and selects n prioritized macrocells N_1 to N_n, which respectively correspond to a RSCP value that is substantially greater than the RSCP lower threshold MIN_RSCP, where n is a natural number greater than 1.

In conclusion, the femtocell core processor 30 of this embodiment first obtains the priority or each of the macrocells in the PLMN list T_PLMN also according to the ratio of past CS and PS services and the CS/PS service weighting of each of the macrocells in the PLMN list T_PLMN, and allocates the information of the neighboring areas according to the macrocells having higher priority values. The RSCP value corresponding to each of the macrocells is substantially greater than the RSCP lower threshold MIN_RSCP. Thus, the femtocell 3 of this embodiment can more efficiently exchange communication between the femtocell 3 and the user equipment to a neighbor capable of supporting communication services associated with the user equipment, thereby offering the user equipment with preferred communication services.

Third Embodiment

Figure 3:
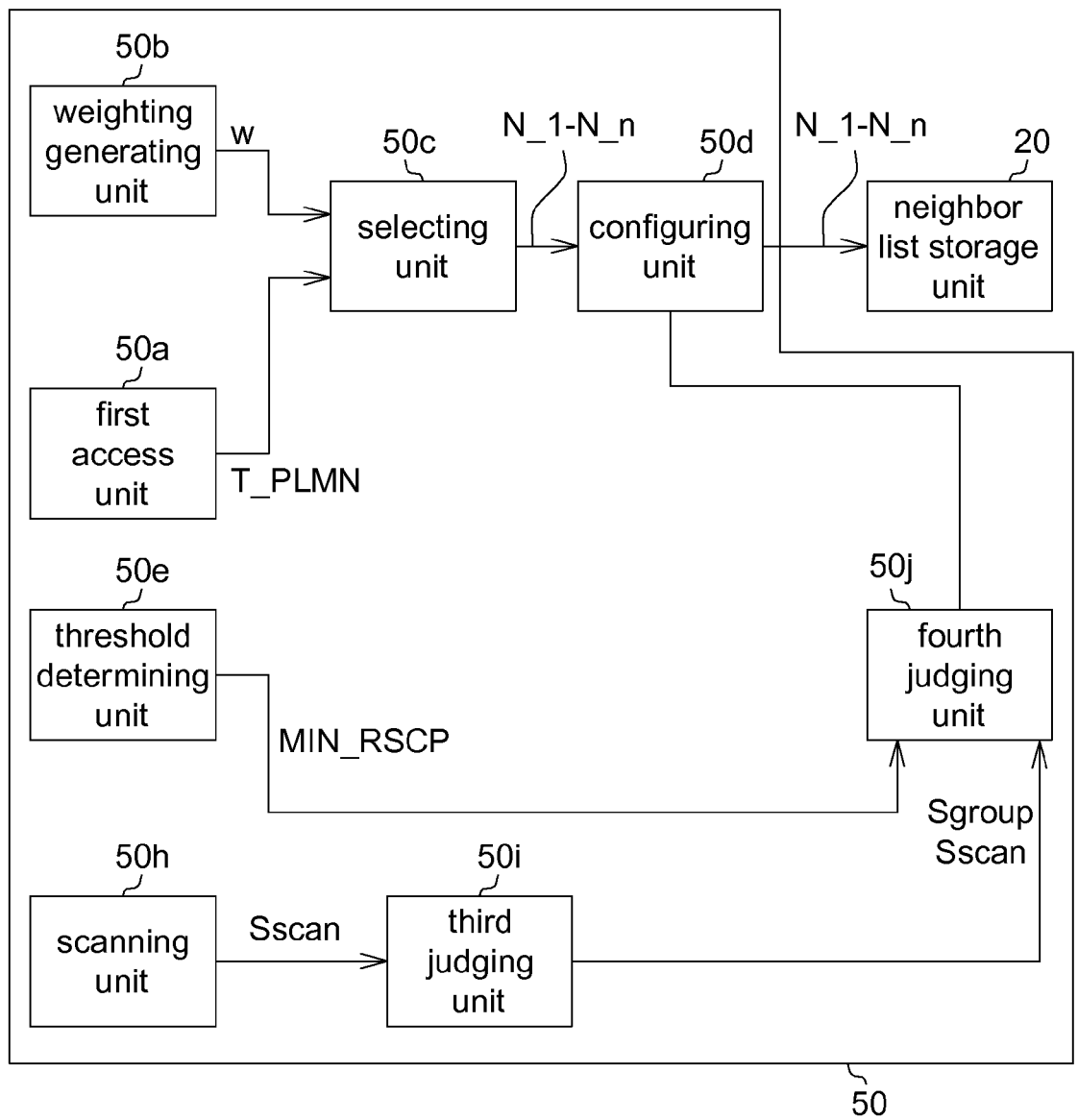
FIG. 3 is a block diagram of a femtocell according to a third embodiment of the present disclosure.

FIG. 3 shows a block diagram of a femtocell according to a third embodiment of the present disclosure. A main difference between a femtocell core processor 50 in this embodiment and the femtocell core processor 10 in the first embodiment is that, the femtocell core processor 50 further includes a threshold determining unit 50e, a scanning unit 50h, a second judging unit 50i and a third judging unit 50j. The threshold determining unit 50e determines an RSCP lower threshold MIN_RSCP.

The scanning unit 50h activates an environment listener function to scan multiple neighboring areas around the femtocell 5 through received surrounding air messages, and decodes broadcasting messages from the surrounding neighboring areas. The scanning unit 50h correspondingly obtains scanned neighboring area list information Sscan according to the environment listener operation.

With reference to the scanned neighboring area list information Sscan, the second judging unit 50i judges whether the neighboring areas of the femtocell 5 and the femtocell 5 correspond to the same group, and provides a group judging signal Sgroup corresponding to the neighboring areas, respectively. For example, in a type 3 or type 4 system information block (3/4 SIB) broadcasting message (a system broadcasting message information structure defined according to the TD-SCDMA protocol) transmitted to the neighboring areas corresponding to the same group as the femtocell 5 of this embodiment, a cell identity ought to have a corresponding predetermined coding mechanism. Thus, the femtocell core processor 50 in this embodiment correspondingly determines whether the neighboring areas and the femtocell 5 correspond to the same group with reference to the cell identify in the broadcasting message SIB 3/4 transmitted from each of the neighboring areas.

Further, for the neighboring cells of the same group having the same settings (e.g., femtocells of the same manufacturer), first 12 bits in the cell indentify are defined as an RNC identifier and last 16 bits are defined as a cell identifier. When broadcasting in the neighboring areas, a predetermined identification sequence is added into the cell identities of the neighboring areas. For example, the predetermined identification sequence includes 14 bits, with 10 of the bits being defined as a group identifier and the remaining 4 of the bits being defined to represent a distinguisher code. Thus, when the femtocell 5 performs the listener operation, it can be determined whether the neighboring areas correspond to the same group as the femtocell 5 according to the predetermined sequence in the cell identify.

In another example, in a 5/6 SIB broadcasting message (also a system broadcasting message information structure defined according to the TD-SCDMA protocol) transmitted to the neighboring areas corresponding to the same group as the femtocell 5 of this embodiment, a PICH power offset parameter P_offset correspondingly has a predetermined coding mechanism. Thus, the femtocell core processor 50 in this embodiment correspondingly determines whether the neighboring areas and the femtocell 5 correspond to the same group with reference to the PICH power offset parameter P_offset in the broadcasting message SIB 5/6 transmitted from each of the neighboring areas.

For both WCDMA and TS-SCDMA communication protocols, the PICH power offset parameter P_offset can be converted into the PCPICH power. According to the definition of a common femtocell, total transmit power should not be greater than a parameter P_max, e.g., 20 dbm. Therefore, according to Equation (3) below, the femtocell 5 of this embodiment can determine whether the PCPICH transmit power P_PCPICH is substantially smaller than a difference between the parameter P_max and the PICH power offset parameter P_offset:

$$P\_PCPICH \leq P\_max - P\_offset \quad (3)$$

For example, in a WCDMA environment, an experience value of P_offset is 10 db; in a TD-SCDMA environment, the experience value of P_offset is 5 db.

When the foregoing equation is established (i.e., P_PCPICH is smaller than or equal to the difference between the parameters P_max and P_offset), it means the neighboring area is a femtocell that corresponds to the same group as the femtocell 5. Conversely, when the foregoing equation is not established (i.e., P_PCPICH is greater than the difference between the parameters P_max and P_offset), it means the neighboring area is not a femtocell and does not correspond to the same group as the femtocell 5.

The third judging unit 50j receives the group judging signals Sgroup of the neighboring areas. When the neighboring areas and the femtocell 5 correspond to the same group, the third judging unit 50j provides the grouping judging signals Sgroup to the configuring unit 50d, which then correspondingly fills the neighboring areas into the neighbor list Table_NA according to the group judging signals Sgroup.

When the neighboring areas and the femtocell 5 do not correspond to the same group, the third judging unit 50j judges whether the RSCP value corresponding the neighboring areas is substantially greater than the RSCP lower threshold MIN_RSCP according to the scanned neighboring area list information Sscan, respectively. When the RSCP corresponding to the neighboring areas is substantially greater than the RSCP lower threshold MIN_RSCP, the third judging unit 50j provides the group judging signals to the configuring unit 50d. Accordingly, the configuring unit 50d fills the neighboring areas corresponding to the RSCP values greater than the RSCP lower threshold MIN_RSCP into the neighbor list Table_NA.

In a practical example, in an operation process of the configuring unit 50d, in response to operations of the scanning unit 50h, the second judging unit 50i and the third judging unit 50j, the neighboring areas corresponding to the same group as the femtocell 5 as well as the neighboring areas corresponding to different groups from the femtocell 5 but having higher RSCP values are added into the neighbor list Table_NA. When space is still available in the neighbor list Table_NA, the configuring unit 50d further adds neighboring areas of CS and PS macrocell priority lists Table_CS and Table_PS into the neighbor list Table_NA. The CS and PS macrocell priority lists Table_CS and Table_PS are generated from operations of a weighting generating unit 50b, a first access unit 50a and a selecting unit 50c.

In conclusion, the femtocell core processor 50 of this embodiment obtains the priority or each of the macrocells in the PLMN list T_PLMN according to the ratio of past CS and PS services and the CS/PS service weighting of each of the macrocells in the PLMN list T_PLMN, and allocates the information of the neighboring areas according to the macrocells having higher priority values. In addition, according to group relations between the femtocell 5 of this embodiment and the neighboring areas, the femtocell core processor 50 of this embodiment further adds the neighboring areas corresponding to the same group or corresponding to different groups but having higher RSCP values into the neighbor list Table_NA.

Fourth Embodiment

Figure 4:
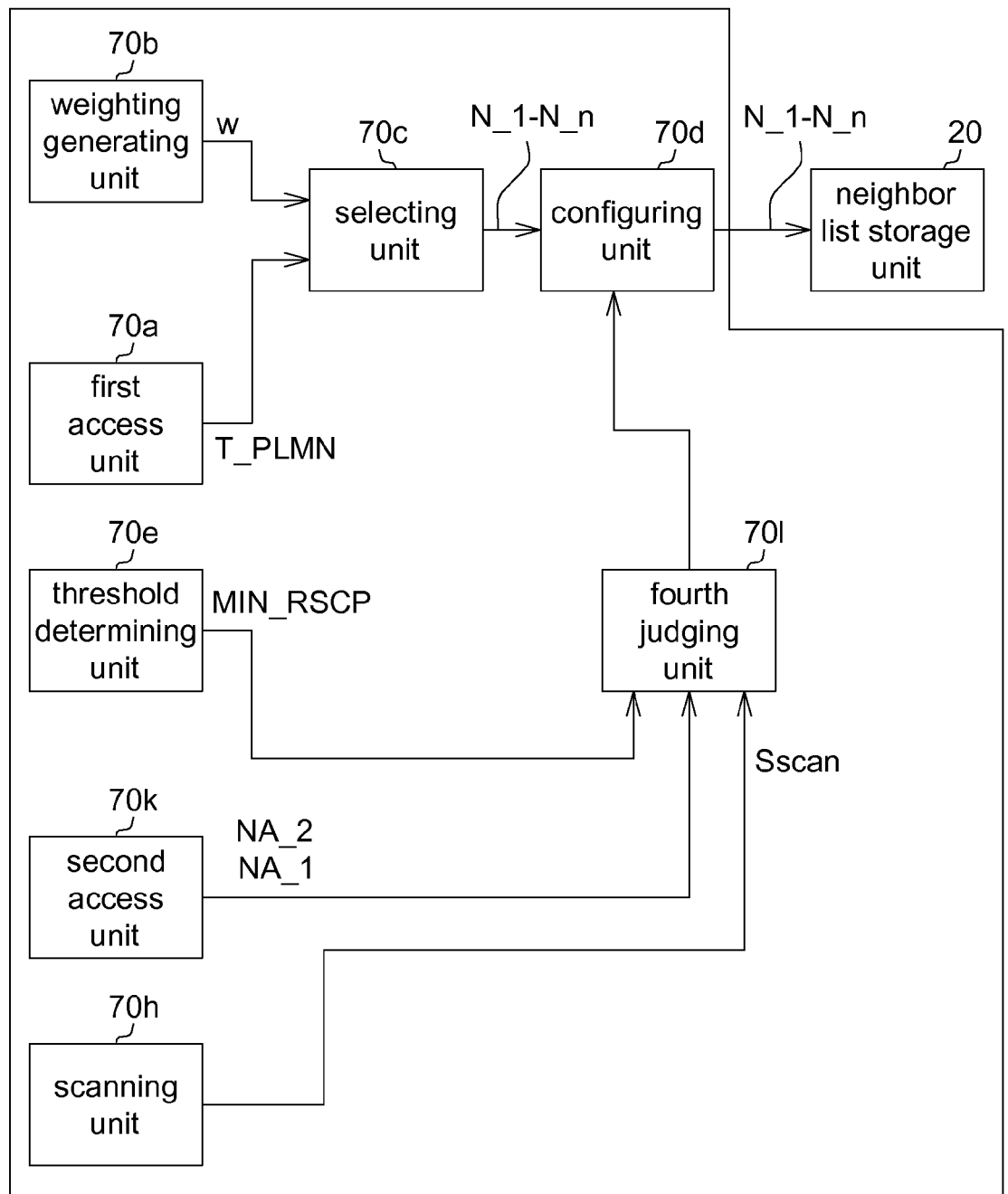
FIG. 4 is a block diagram of a femtocell according to a fourth embodiment of the present disclosure.

FIG. 4 shows a block diagram of a femtocell according to a fourth embodiment of the present disclosure. A main difference between a femtocell core processor 70 of this embodiment and the femtocell core processor 10 in the first embodiment is that, the femtocell core processor 70 further includes a second access unit 70k, a scanning unit 70h, a threshold determining unit 70e and a fourth judging unit 70l. The threshold determining unit 70e determines an RSCP lower threshold MIN_RSCP. The scanning unit 70h activates an environment listener function to scan multiple neighbors around the femtocell 7 through received surrounding air messages, and decodes broadcasting messages from surrounding neighboring areas to obtain scanned neighboring area list information Sscan according to the environment listener operation.

The second access unit 70k accesses predetermined neighboring area list information, e.g., neighboring area information provided by a system provider. The predetermined neighboring area information includes multiple sets of first neighboring area information NA_1 marked with must-include tags and multiple sets of second neighboring area information NA_2 not marked with must-include tags.

The fourth judging unit 70*l* receives the predetermined neighboring area list information, and provides the first neighboring list information NA_1 marked with must-include tags to a configuring unit 70*d*, which accordingly fills the first neighboring area information NA_1 into the neighbor list Table_NA.

The fourth judging unit 70*l* further receives the RSCP lower threshold MIN_RSCP and the scanned neighboring area list information Sscan, and judges whether the RSCP values corresponding to the multiple sets of second neighboring area information NA_2 are substantially greater than the RSCP lower threshold MIN_RSCP. When the RSCP values are substantially greater than the RSCP lower threshold MIN_RSCP, the fourth judging unit 70*l* provides the corresponding second neighboring area information NA_2 to the configuring unit 70*d*, which accordingly fills the second neighboring area information NA_2 into the neighbor list Table_NA.

In a practical example, in an operation process of the configuring unit 70*d*, in response to operations of the scanning unit 70*h*, the second access unit 70*k* and the fourth judging unit 70*l*, the first neighboring area information NA_1 marked with must-include tags and the second neighboring area information NA_2 not marked with must-include tags but corresponding to RSCP values greater than the RSCP lower threshold MIN_RSCP in the predetermined neighboring area information are added into the neighbor list Table_NA. When space is still available in the neighbor list Table_NA, the configuring unit 70*d* further adds neighboring areas of CS and PS macrocell priority lists Table_CS and Table_PS into the neighbor list Table_NA. The CS and PS macrocell priority lists Table_CS and Table_PS are generated from operations of a weighting generating unit 70*b*, a first access unit 70*a* and a selecting unit 70*c*.

In conclusion, the femtocell core processor 70 of this embodiment obtains the priority or each of the macrocells in the PLMN list T_PLMN according to the ratio of past CS and PS services and the CS/PS service weighting of each of the macrocells in the PLMN list T_PLMN, and allocate the information of the neighboring areas according to the macrocells having higher priority values. In addition, with reference to the predetermined neighboring area list information, the femtocell core processor 70 in this embodiment adds the first neighboring area information NA_1 marked with must-include tags and the second neighboring area information NA_2 not marked with must-include tags but corresponding to RSCP values greater than the RSCP lower threshold MIN_RSCP into the neighbor list Table_NA.

Fifth Embodiment

Figure 5:
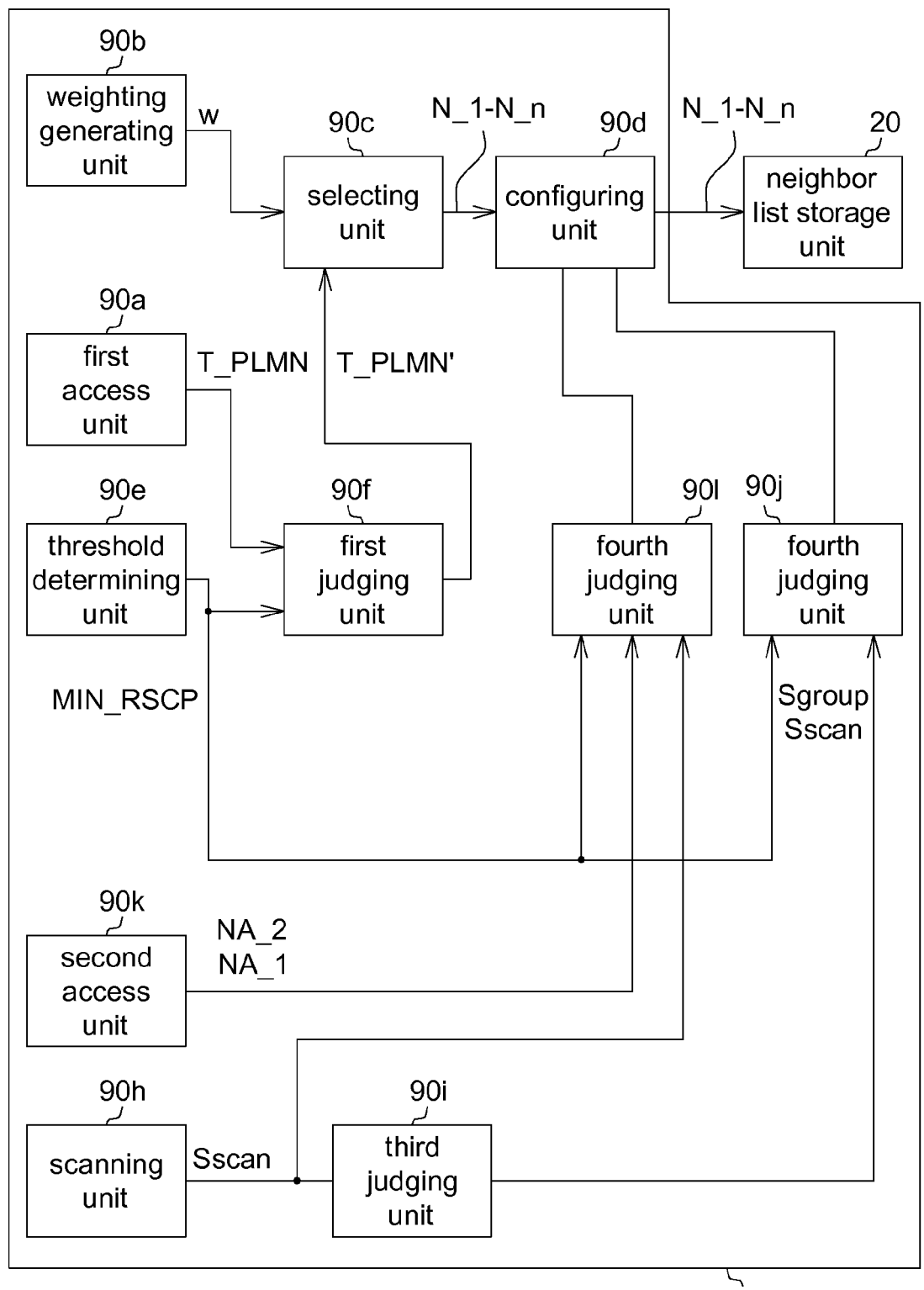
FIG. 5 is a block diagram of a femtocell according to a fifth embodiment of the present disclosure.
Figure 6:
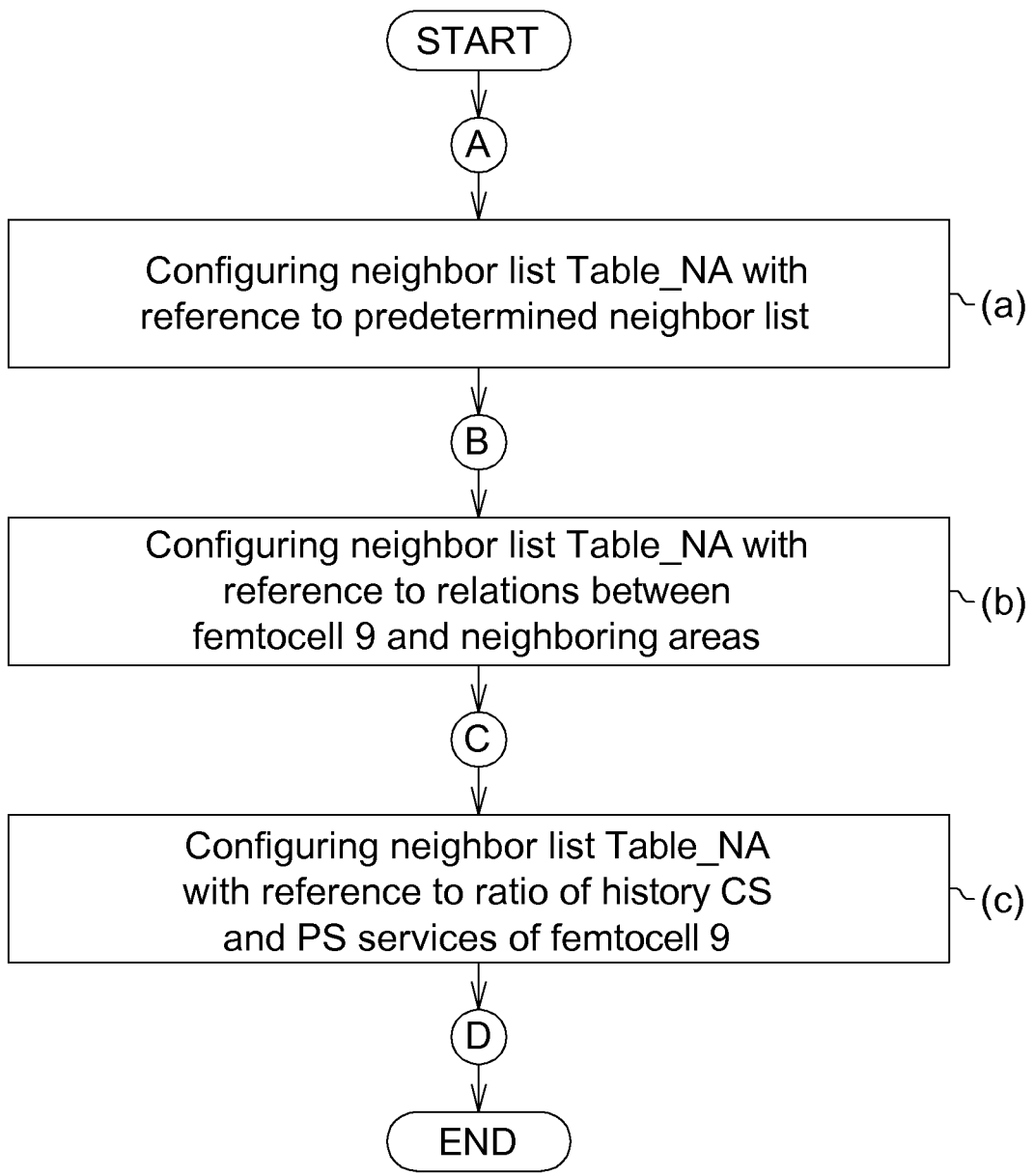
FIG. 6 is a flowchart of a method for configuring a neighbor list according to the fifth embodiment of the present disclosure.
Figure 7A:
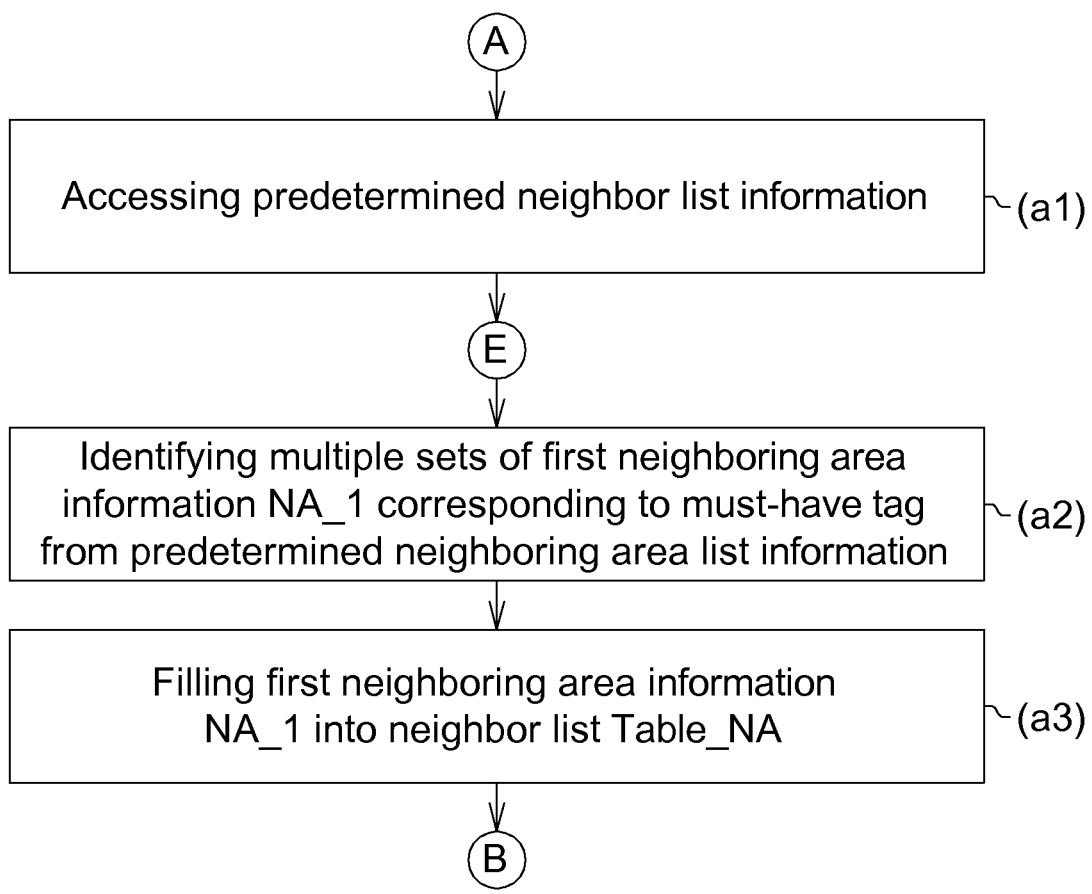
FIGS. 7A and 7B are partial flowcharts of a method for configuring a neighbor list according to the fifth embodiment of the present disclosure.
Figure 7B:
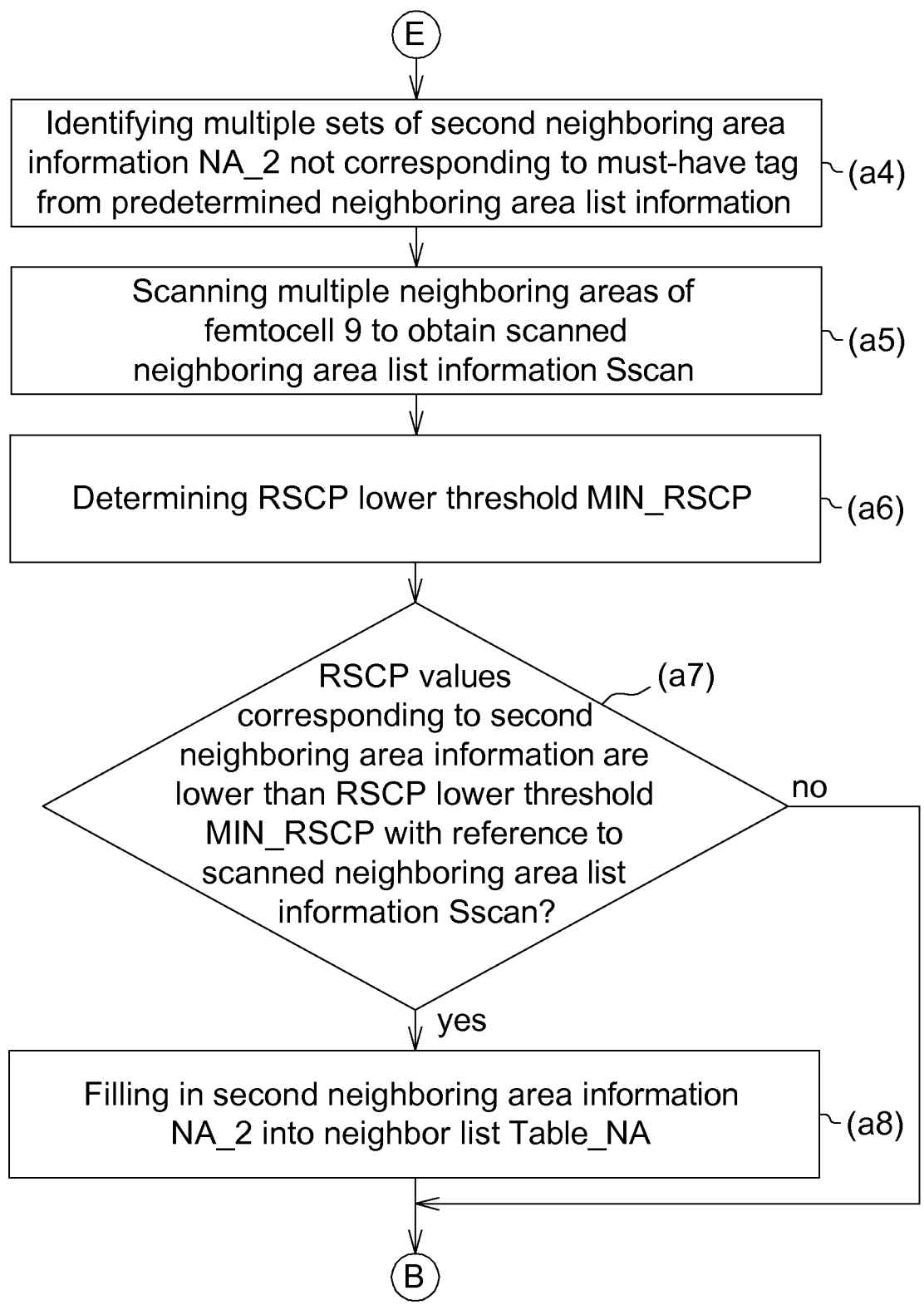
Figure 8:
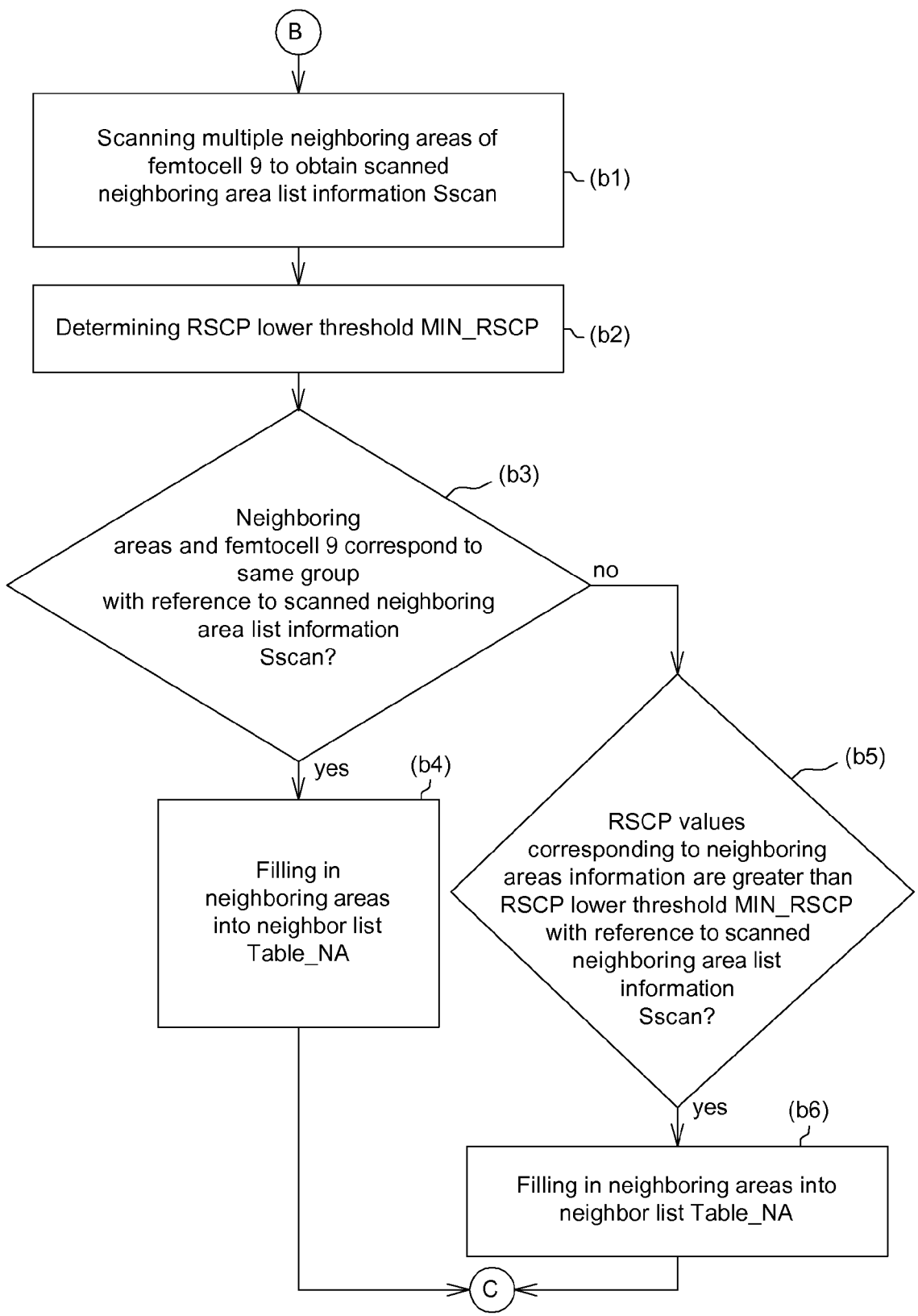
FIG. 8 is a partial flowchart of a method for configuring a neighbor list according to the fifth embodiment of the present disclosure.
Figure 9:
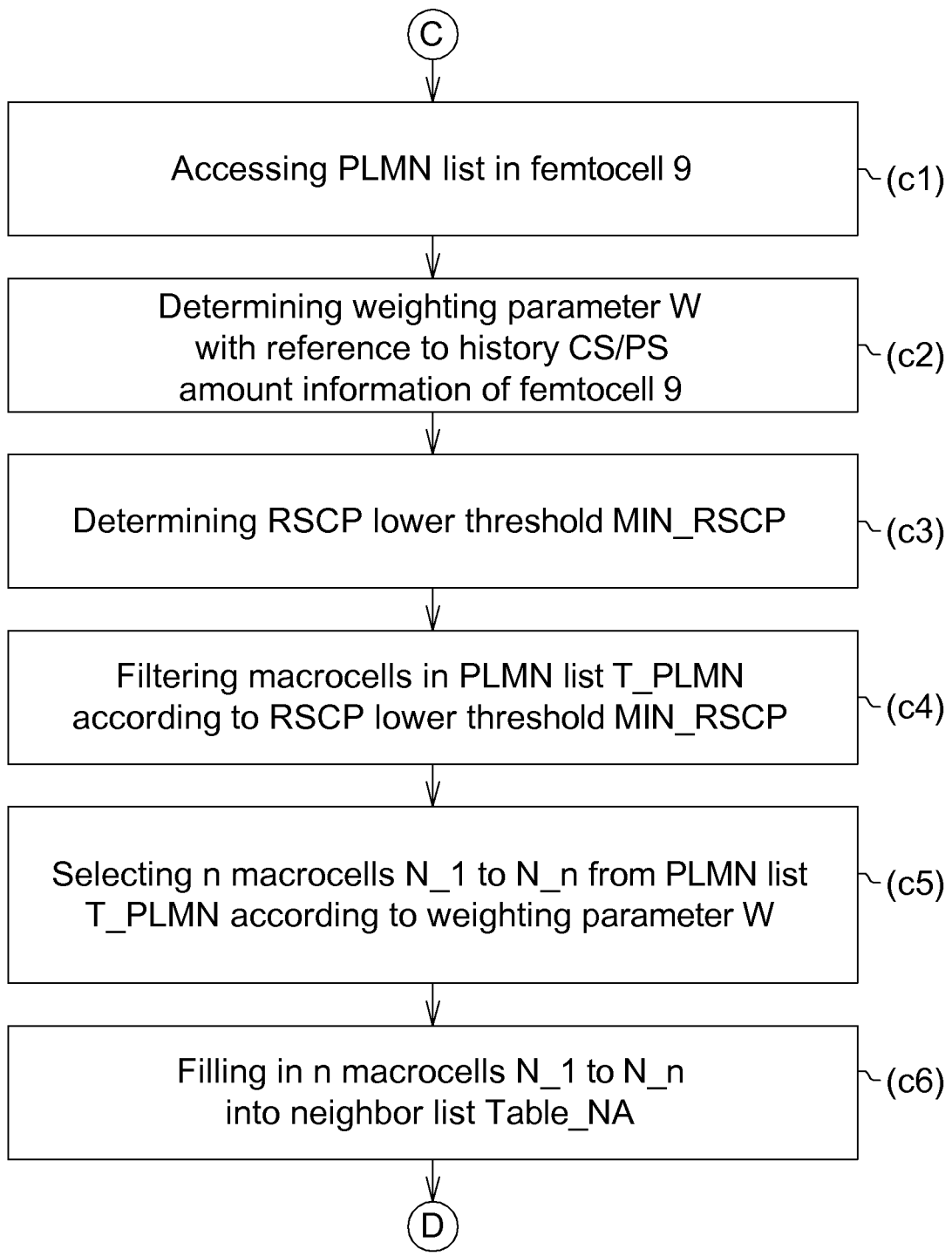
FIG. 9 is a partial flowchart of a method for configuring a neighbor list according to the fifth embodiment of the present disclosure.

FIG. 5 shows a block diagram of a femtocell according to a fifth embodiment of the present disclosure. A main difference between a femtocell core processor 90 of this embodiment and the femtocell core processors 10, 30, 50 and 70 in the first to fourth embodiments is that, the femtocell core processor 90 integrates all the units in the femtocell core processors 10, 30, 50 and 70, and configures the neighbor list Table_NA with simultaneous reference to a ratio of history CS and PS services, group relations between the femtocell 9 and the neighboring areas and the predetermined neighboring area list information.

For example, the femtocell core processor 90 sequentially performs operations of configuring the neighbor list Table_NA with reference to the predetermined neighbor list, operations of configuring the neighbor list Table_NA with reference to the group relations between the femtocell 9 and the neighboring areas, and operations of configuring the neighbor list Table_NA with reference to the ratio of history CS and PS services of the femtocell 9. For example, the flowcharts are as shown in FIGS. 6, 7A, 7B, 8 and 9.

Therefore, in the femtocell core processor and the method for configuring a neighbor list for a femtocell according to this embodiment, the priority value of each of the macrocells in the PLMN list T_PLMN is obtained with reference to the ratio of history CS and PS services and the CS/PS service weighting of each of the macrocells in the PLMN list, and information of the neighboring areas is allocated according to the macrocells having higher priority values. Therefore, compared to a conventional method for configuring a neighbor list of a femtocell, the femtocell core processor and the method for configuring a neighbor list of the present disclosure offer an advantage of configuring a neighbor list according to history CS/PS amounts and by flexibly referring to PLMN list information.

While the disclosure has been described by way of example and in terms of the preferred embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A neighbor list configuring method, applied to a femtocell to establish a neighbor list, the method comprising:
   accessing a Public Land Mobile Network (PLMN) list in the femtocell, the PLMN list recording a circuit-switched (CS) and a packet-switched (PS) service weighting;
   determining a weighting parameter with reference to history CS/PS amount information and the CS/PS service weighting;
   selecting n macrocells from the PLMN list according to the weighting parameter, n being a natural number; and
   filling the n macrocells into the neighbor list;
   wherein the history CS/PS amount information is a ratio of CS service history amount to PS service history amount, and the CS/PS service weighing is a ratio of the CS service weighting to the PS service weighting.

2. The method according to claim 1, further comprising:
   determining a received signal code power (RSCP) lower threshold; and
   judging whether an RSCP value corresponding to each macrocell in the PLMN list is substantially greater than the RSCP lower threshold to filter the macrocells in the PLMN list;
   wherein, the RSCP values corresponding to the n macrocells are substantially greater than the RSCP lower threshold.

3. The method according to claim 1, further comprising:
   scanning a plurality of neighboring areas around the femtocell to obtain scanned neighboring area list information;
   judging whether the neighboring areas and the femtocell correspond to a same group with reference to the scanned neighboring area list information; and
   when the neighboring areas and the femtocell correspond to the same group, filling the neighboring areas into the neighbor list.

4. The method according to claim 3, further comprising:
determining an RSCP lower threshold;
when the neighboring areas and the femtocell do not correspond to the same group, judging whether RSCP values corresponding to the neighboring areas are substantially greater than the RSCP lower threshold according to the scanned neighboring area list information;
when the RSCP values of the neighboring areas are substantially greater than the RSCP lower threshold, filling the neighboring areas into the neighbor list.

5. The method according to claim 1, further comprising:
accessing predetermined neighboring area list information; and
identifying a plurality of sets of neighboring area information corresponding to a must-include tag from the predetermined neighboring area list information, and filling the first neighboring area information into the neighbor list.

6. The method according to claim 5, further comprising:
scanning a plurality of neighboring areas around the femtocell to obtain scanned neighboring area list information;
identifying a plurality of sets of second neighboring area information not corresponding to the must-include tag from the predetermined neighboring area list information;
determining an RSCP lower threshold;
judging whether RSCP values corresponding to the second neighboring area information are substantially greater than the RSCP lower threshold with reference to the scanned neighboring area list information; and
when the RSCP values corresponding to the second neighboring area information are substantially greater than the RSCP lower threshold, filling the second neighboring area information into the neighbor list.

7. A femtocell core processor, applied to a femtocell, the femtocell comprising a neighbor list storage unit for storing a neighbor list, the femtocell core processor for configuring the neighbor list, the femtocell core processor comprising:
a first access unit, for accessing a PLMN list in the femtocell, the PLMN list recording a CS and a PS service weighting;
a weighting generating unit, for determining a weighting parameter with reference to history CS/PS amount information and the CS/PS service weighting;
a selecting unit, for selecting n macrocells from the PLMN list according to the weighting parameter, n being a natural number; and
a configuring unit, for filling the n macrocells into the neighbor list;
wherein the history CS/PS amount information is a ratio of CS service history amount to PS service history amount, and the CS/PS service weighing is a ratio of the CS service weighting to the PS service weighting.

8. The femtocell core processor according to claim 7, further comprising:
a threshold determining unit, for determining an RSCP lower threshold; and
a first judging unit, for judging whether an RSCP value corresponding to each macrocell in the PLMN list is substantially greater than the RSCP lower threshold to filter the macrocells in the PLMN list;
wherein, the RSCP values corresponding to the n macrocells are substantially greater than the RSCP lower threshold.

9. The femtocell core processor according to claim 7, further comprising:
a scanning unit, for scanning a plurality of neighboring areas around the femtocell to obtain scanned neighboring area list information;
a second judging unit, for judging whether the neighboring areas and the femtocell correspond to a same group with reference to the scanned neighboring area list information; and
when the neighboring areas and the femtocell correspond to the same group, the configuring unit fills the neighboring areas into the neighbor list.

10. The femtocell core processor according to claim 9, further comprising:
a threshold determining unit, for determining an RSCP lower threshold;
a third judging unit, for judging whether RSCP values of the neighboring areas are substantially greater than the RSCP lower threshold according to the scanned neighboring area list information when the neighboring areas and the femtocell do not correspond to the same group;
when the RSCP values corresponding to the neighboring areas are substantially greater than the RSCP lower threshold, the configuring unit fills the neighboring areas into the neighbor list.

11. The femtocell core processor according to claim 7, further comprising:
a second access unit, for accessing predetermined neighboring area list information, and identifying a plurality of sets of first neighboring area information corresponding to a must-include tag from the predetermined neighboring area list information;
wherein, the configuring unit fills the first neighboring area information into the neighbor list.

12. The femtocell core processor according to claim 11, wherein the second access unit further identifies a plurality of sets of second neighboring area information not corresponding to the must-include tag from the predetermined neighboring area list information; the femtocell core processor further comprising:
a scanning unit, for scanning a plurality of neighboring areas around the femtocell to obtain scanned neighboring area list information;
a threshold determining unit, for determining an RSCP lower threshold; and
a fourth judging unit, for judging whether RSCP values corresponding to the second neighboring area information are substantially greater than the RSCP lower threshold with reference to the scanned neighboring area list information; and
when the RSCP values corresponding to the second neighboring area information are substantially greater than the RSCP lower threshold, the configuring unit fills the second neighboring area information into the neighbor list.

* * * * *